(12) United States Patent
Roozeboom et al.

(10) Patent No.: US 10,972,635 B2
(45) Date of Patent: *Apr. 6, 2021

(54) SYNCHRONIZING WIRELESS SENSOR DATA AND VIDEO

(71) Applicant: Myriad Sensors, Inc., Mountain View, CA (US)

(72) Inventors: Clifton Roozeboom, Mountain View, CA (US); Andrew Bellay, San Francisco, CA (US); David Bakker, San Jose, CA (US)

(73) Assignee: MYRIAD SENSORS, INC., Mountain View, CA (US)

( * ) Notice: Subject to any disclaimer, the term of this patent is extended or adjusted under 35 U.S.C. 154(b) by 141 days.

This patent is subject to a terminal disclaimer.

(21) Appl. No.: 16/118,013

(22) Filed: Aug. 30, 2018

(65) Prior Publication Data

US 2019/0007584 A1    Jan. 3, 2019

Related U.S. Application Data

(63) Continuation of application No. 15/085,138, filed on Mar. 30, 2016, now Pat. No. 10,075,623.

(Continued)

(51) Int. Cl.
*H04N 5/04*    (2006.01)
*G11B 20/10*   (2006.01)
*H04N 5/45*    (2011.01)

(52) U.S. Cl.
CPC ......... *H04N 5/04* (2013.01); *G11B 20/10527* (2013.01); *H04N 5/45* (2013.01); *G11B 2020/10537* (2013.01)

(58) Field of Classification Search
CPC .... G11B 2020/10537; G11B 20/10527; H04N 5/04; H04N 5/45

(Continued)

(56) References Cited

U.S. PATENT DOCUMENTS 9,025,937 B1 *  5/2015  Congedo ............. G11B 27/034
                                                  382/309
2008/0130949 A1 * 6/2008  Ivanov ................. H04N 7/181
                                                  382/103

(Continued)

OTHER PUBLICATIONS

PowerPlay Test Analysis Software, 2012. < https://web.archive.org/web/20150212202225/http://micro-sys.com/resources/PDF/PowerPlay.pdf >. (Year: 2012).*

*Primary Examiner* — Thai Q Tran
*Assistant Examiner* — Stephen R Smith
(74) *Attorney, Agent, or Firm* — Hickman Becker Bingham Ledesma LLP; Malgorzata A. Kulczycka

(57) ABSTRACT

Techniques are provided to implement the display of synchronized sensor data and captured video signal. A mobile computing device receives a set of data points from a multi-sensor device. The set of data points may be assigned a timestamp value, obtained from an internal clock within the mobile computing device. Sets of data points and their assigned timestamp values are aggregated into an aggregated sensor dataset that represents the sets of data points over a particular period of time. Concurrently to receiving the sensor data, video frames are received. The video frames with an assigned timestamp value are stored in a video frame dataset that represents video frames over a particular period of time. The aggregated sensor dataset and the video frame dataset are synchronized and combined into a single combined video dataset based upon the assigned timestamp values of the sets of data points and the video frames.

18 Claims, 9 Drawing Sheets

Related U.S. Application Data

(60) Provisional application No. 62/140,322, filed on Mar. 30, 2015.

(58) Field of Classification Search
USPC ....... 386/278, 227, 201, 224, 241, 280, 282; 715/723, 762
See application file for complete search history.

(56) References Cited

U.S. PATENT DOCUMENTS

| | | | |
|---|---|---|---|
| 2012/0287341 A1 | 11/2012 | Choi | |
| 2013/0128022 A1* | 5/2013 | Bose | H04N 7/18 348/77 |
| 2013/0182107 A1* | 7/2013 | Anderson | G06T 7/20 348/143 |
| 2014/0133836 A1* | 5/2014 | Burns | G11B 27/10 386/278 |
| 2015/0098688 A1 | 4/2015 | Lokshin | |
| 2015/0149837 A1 | 5/2015 | Alonso | |
| 2015/0222843 A1* | 8/2015 | Avrahami | H04N 21/4122 386/219 |
| 2015/0269435 A1 | 9/2015 | Bentley | |
| 2016/0065984 A1* | 3/2016 | Nejat | G06F 16/70 348/231.3 |
| 2016/0189752 A1* | 6/2016 | Galant | H04N 9/8205 386/224 |
| 2016/0196852 A1* | 7/2016 | Sievert | G11B 27/3027 386/241 |
| 2016/0295078 A1 | 10/2016 | Roozeboom | |

* cited by examiner

SYNCHRONIZING WIRELESS SENSOR DATA AND VIDEO

BENEFIT CLAIM

This application claims the benefit under 35 U.S.C. § 120 as a continuation of application Ser. No. 15/085,138, filed Mar. 30, 2016, which claims the benefit under 35 U.S.C. 119(e) of provisional application 62/140,322, filed Mar. 30, 2015, the entire contents of which are hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

FIELD OF THE DISCLOSURE

The present disclosure relates to computer-implemented processes for synchronizing one data source with another data source. More specifically, the disclosure relates to computer-implemented processes that are configured or programmed for synchronizing a stream of sensor data from a wireless multi-sensor device with a stream of video data from a separate computing device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

There are many known techniques and devices for teaching science concepts. Most of these include simple devices constructed to illustrate various principles, for example, a ramp to demonstrate force and friction, a pendulum to display harmonic motion, circular objects or simple balls to show elastic and inelastic collisions, or gravity acting on a falling object. More advanced classrooms will use electronic devices that can measure temperature, force, pH, or other parameters. Most of these include wired probes and base station modules with electronics and displays.

In recent years, inexpensive sensors have been developed primarily for the mobile computing or smart phone market that can measure temperature, acceleration, humidity, barometric pressure, and other parameters, and these are integrated with functions of the smart phone for games, tracking motion, indicated damage, and other purposes. Since the volume of smart phones is so high, these sensors have become cheap. Many companies are making these sensors available separately so that they can be integrated into other devices and inventions. Mobile computing devices such as tablet computers or smart phones also usually come equipped with a miniature video camera and are capable of recording a live-action scene as video data that can be replayed at another time.

DETAILED DESCRIPTION

Figure 1:
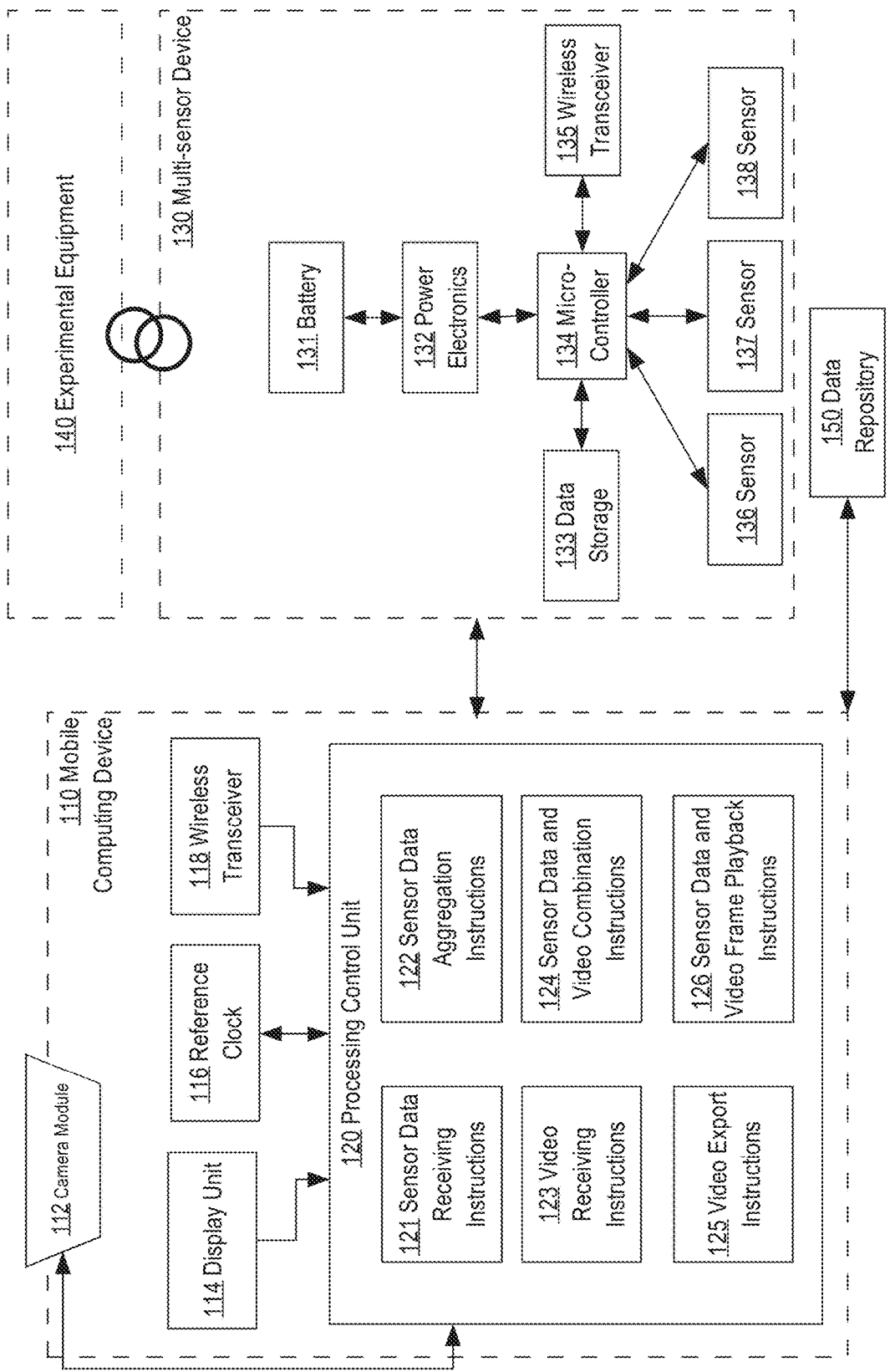
FIG. 1 illustrates an example data processing system including interactions between a mobile computing device and a multi-sensor device.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. For purposes of clarity and conciseness, in some instances this disclosure refers to certain data values, which are stored and used in electronic digital form in memory or non-volatile storage, using labels that represent concepts or abstractions. However, each instance in this detailed description of using or referring to an abstract item or concept is intended to encompass one or more electronically digitally stored instructions or data values that represent or correspond to the specified abstract item or concept. In other words, the disclosure is directed to practical applications of the concepts described herein using the particular computers, computer memory, computer storage, and computer communications that are described herein, and is not intended to encompass all means of implementing the abstract items or concepts nor to encompass the abstract items or concepts themselves. Embodiments are disclosed in sections according to the following outline:
1. GENERAL OVERVIEW
2. SYSTEM OVERVIEW
  2.1. MULTI-SENSOR DEVICE
  2.2. MOBILE COMPUTING DEVICE
3. FUNCTIONAL OVERVIEW
  3.1. SENSOR DATA INPUT
  3.2. VIDEO FRAME INPUT
  3.3. SYNCHRONIZED AND COMBINED VIDEO
  3.4. SIMULTANEOUS PLAYBACK
4. VIDEO AND SENSOR DATA GRAPH DISPLAY
5. HARDWARE OVERVIEW

1. General Overview

In an embodiment, a multi-sensor device comprises a microcontroller, one or more wireless communication transceivers, and a plurality of wireless sensors. The multi-sensor device may be programmed or configured to sense physical movements or changes on attached equipment over time using any of the wireless sensors, while attached to or mounted on the equipment. Wireless communication transceivers may transmit sensor data to a mobile computing device, such as a laptop computer, tablet computer, or smart phone. The mobile computing device may be programmed with an application or app that is capable of receiving sensor data via wireless interfaces and storing, transforming, analyzing, and/or displaying the data.

In an embodiment, the mobile computing device further comprises a miniature video camera and programs and/or device drivers that are programmed or configured to capture a real-time stream of video data of action occurring in real-time in a physical environment. For example, the video may record movement or action of the equipment to which the multi-sensor device is attached. Techniques are provided to implement the display of the sensor data from the multi-sensor device and the video signal from the mobile computing device in synchronization.

In an embodiment, the mobile computing device may implement a method for synchronizing and simultaneously displaying sensor data and a video signal. The mobile computing device may be equipped with a wireless transceiver that is programmed to receive sensor data from the multi-sensor device. The sensor data may include an observed set of data points from a plurality of physical sensors attached to the multi-sensor device. The set of data points represent observations at a particular point in time. The mobile computing device assigns a timestamp value, obtained from an internal clock within the mobile computing device, to the received set of data points. The mobile computing device aggregates and stores, within the mobile computing device, one or more sets of data points with their assigned timestamp values into an aggregated sensor dataset. The aggregated sensor dataset represents the one or more sets of data points over a particular period of time. Concurrent with receiving the sensor data, the mobile computing device receives one or more video frames that represent captured digital images from the video signal at a particular point in time. The mobile computing device then stores the one or more video frames with an assigned timestamp value, received from the internal clock, into a video frame dataset that represents one or more video frames over a particular period of time. The mobile computing device synchronizes and combines the aggregated sensor dataset and the video frame dataset into a single combined video dataset based upon the assigned timestamp values of the one or more sets of data points and the one or more video frames. The single combined video frame dataset represents a synchronized video, over a particular period of time, that displays the video frames combined with the one or more sets of data points.

2. System Overview

FIG. 1 illustrates an embodiment of a data processing system including connections and signal paths that may be used to illustrate certain interactions between a mobile computing device and a multi-sensor device. In an embodiment, the multi-sensor device 130 is configured or programmed to wirelessly transmit sensor data to the mobile computing device 110 for the purposes of recording changes observed by the multi-sensor device 130 that is physically attached to experimental equipment 140.

2.1. Multi-Sensor Device

In an embodiment, the multi-sensor device 130 comprises a housing that contains a battery unit, power electronics, a microcontroller, a data storage unit, a wireless transceiver, and multiple sensor units. The multi-sensor device 130 may be physically attached to experimental equipment 140 for the purpose of capturing physical changes occurring to the experimental equipment 140. In an embodiment, the multi-sensor device 130 may be attached physically to experimental equipment 140 using a variety of mechanical fasteners, straps, adhesive tape, or a fabric fastener such as Velcro. Typically, the means of attachment are removable, so that the same multi-sensor device 130 may be attached to one equipment item, used, and then removed and re-attached to a different equipment item at a different time. In an embodiment, the experimental equipment 140 may include, but is not limited to, objects such as springs, lever arms, catapults, vehicles, robots, balls, or any other piece of equipment desired to be measured.

FIG. 1 also illustrates an example of internal components of the multi-sensor device 130 and their functional connections. In an embodiment, a battery 131 provides power for the multi-sensor device 130, and may be coupled to power electronics 132, which may be configured to regulate voltage from the battery 131 to maintain power requirements for the multi-sensor device 130. Power electronics 132 and battery 131 may form a regulated DC power supply and may implement power conservation logic. For example, if the multi-sensor device 130 has not detected any change in the environment or position of the experimental equipment 140, then the multi-sensor device 130 may be programmed to switch to a sleep or power saving mode in order to conserve the limited power stored in the battery 131. In this example, the power electronics 132 may regulate the power consumption to the microcontroller 134 or other components by restricting the total power throughput from the battery 131 or by selectively turning off select components, such as sensors or wireless transceiver 135, within the multi-sensor device 130.

In an embodiment, the microcontroller 134 is configured to perform specific data input and output tasks between the other components within the multi-sensor device 130. For example, the microcontroller 134 is configured to receive sensor data from the multiple sensors and send the sensor data to the data storage unit 133 for temporary or permanent storage. The microcontroller 134 is also configured to send the stored sensor data to the wireless transceiver 135; the sent sensor data is then wirelessly transmitted to the mobile computing device 110.

In an embodiment, the data storage unit 133 within the multi-sensor device 130 may include, but is not limited to, a magnetic disk, optical disk, solid-state drive, or other dynamic storage media. In an embodiment the wireless transceiver 135 is configured to transmit sensor data via a wireless network using communications, such as Bluetooth, Bluetooth low energy, WiFi, ZigBee, or any other wireless protocol.

In an embodiment, the microcontroller 134 is coupled to one or more sensor devices. FIG. 1 depicts an example multi-sensor device 130 containing three sensor devices. Other embodiments may contain any number of sensors. In an embodiment, sensor 136 is a temperature sensor configured to measure the outside temperature. In an embodiment, sensor 137 is a three-axis accelerometer configured to measure acceleration over the x, y, and z-axes. In an embodiment, sensor 138 is a pressure sensor configured to measure atmospheric pressure. In other embodiments, the multi-sensor device 130 may comprise multiple different sensors that are programmed or configured to measure different observations including, but not limited to, a three-axis gyroscope, a three-axis magnetometer, a humidity sensor, a barometric pressure sensor, an infrared temperature sensor, or any other sensor.

The multi-sensor device may be mounted in a protective case with features in the case such as a lens for visible light, UV light, infrared light, or other light, various mechanical switch apparatus. A protective case may be used that can protect sensors from impact, water, and other environmental issues, and also serve as a secure mounting point. In an embodiment, the case comprises a case back that is affixed to a sensor card using two or more assembly screws. The card includes an electronic switch that may rest against a mechanical button configured in a side wall of the case front, which is configured to fit snugly over the sensor card and mate to the case back using the screws. In an embodiment the electronic switch is configured to provide single-button control for turning on the sensor card and causing power-up, initialization, and triggering execution of instructions in firmware. In an embodiment the case front has indicia indicating axes to enable the user to orient sensors in a particular way.

Various mechanical mounting methods for a case may be used. For example, the case may be mounted within a perimeter bracket or using various clip and mount arrangements to attach to a vehicle, tripod, chassis, scientific apparatus, sports item, or other item. Various features in the case may allow the sensors to connect to the outside, for example, a lens for infrared light, a pressure sensor, a switch to turn on the communication, and electrical connections for probes. In other embodiments, there may be other features on the case for mounting on other apparatus, like the armature of a robot, or a surface of a ball, or hooks for a lanyard, or mounts that are threaded and can accept a screw or bolt. Also, the case can have slots to connect to a mounting system. Also, the case can be surrounded by another outside protective case, or harder material, or water proof material, or softer material to cushion impact, or any other kind of outer shell.

2.2. Mobile Computing Device

In an embodiment, the mobile computing device 110 is wirelessly coupled to a multi-sensor device 130. The mobile computing device 110 comprises a camera module 112 that includes a video camera and video recording capability, a display unit 114, a wireless transceiver 118 such as a Bluetooth transceiver, a reference clock 116, and a processing control unit 120.

In an embodiment, mobile computing device 110 may represent a mobile computer such as a laptop computer, tablet computer, or smartphone that implements an application that connects to the multi-sensor device 130 wirelessly. In an embodiment, a four-layer software technology stack or architecture is implemented. A first layer comprises a client user interface that may be implemented on a mobile device user interface based upon any of a plurality of mobile device operating systems or architectures such as APPLE IOS, GOOGLE ANDROID, WINDOWS MOBILE, etc. The client UI also may implement a web user interface that provides support for major browsers such as MOZILLA FIREFOX, GOOGLE CHROME, etc. The first layer is coupled via API calls or other interfaces to a second layer that implements functions via RESTful APIs and a database layer. The second layer may be coupled to a third layer comprising mobile managers, such as a data persistence module and one or more Bluetooth manager modules and/or sensor manager modules. The third layer may be coupled using primitive calls or digital logic at the hardware level to a fourth layer that implements hardware and firmware, such as PCB and Bluetooth firmware and also includes a printed circuit board of the sensor card and attached sensors.

In an embodiment, a variety of communication methods may be used to wirelessly connect to the multi-sensor device 130 including, but not limited to, Bluetooth, Bluetooth low energy, Wi-Fi, Zigbee, or other wireless protocol. The wireless transceiver 118 is used for wireless communication with the multi-sensor device 130. Wireless communication includes, but is not limited to, requesting a link to the multi-sensor device 130, establishing a secure connection with the multi-sensor device 130, and receiving sensor data from the multi-sensor device 130.

In an embodiment, the processing control unit 120 receives the sensor data from the wireless transceiver 118. The processing control unit 120 then communicates with the reference clock 116 in order to establish a timestamp for the received sensor data.

In an embodiment, the camera module 112 is used to capture video. The captured video is then sent to the processing control unit 120 in order to record a timestamp to the video frames captured.

In an embodiment, the processing control unit 120 contains specially configured logic including, but not limited to, sensor data receiving instructions 121, sensor data aggregation instructions 122, video receiving instructions 123, sensor data and video combination instructions 124, video export instructions 125, and sensor data and video frame playback instructions 126. Each of the foregoing elements is further described in structure and function in other sections herein. Each of the elements comprise executable instructions loaded into a set of one or more pages of main memory, such as RAM, in the processing control unit 120 which when executed cause the processing control unit 120 to perform the functions or operations that are described herein with reference to those modules. For example, the sensor data receiving instructions 121 may comprise executable instructions loaded into a set of pages in RAM that contain instructions which when executed cause performing sensor receiving functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of the sensor data receiving instructions 121, the sensor data aggregation instructions 122, the video receiving instructions 123, the sensor data and video combination instructions 124, the video export instructions 125, and the sensor data and video frame playback instructions 126 also may represent one or more files or projects of source code that are digitally stored in a mass storage device such as non-volatile RAM or disk storage, in the processing control unit 120 or in the mobile computing device 110, which when compiled or interpreted generate executable instructions which when executed cause the processing control unit 120 to perform the functions or operations that are described herein with reference to those modules. In other words, the drawing figure may represent the manner in which programmers or software developers organize and arrange source code for later compilation into an executable, or interpretation into bytecode or the equivalent, for execution by the processing control unit 120.

The sensor data receiving instructions 121 provide instruction to initialize wireless communication with the multi-sensor device 130 and receive sensor data from the multi-sensor device 130. The sensor data receiving instructions 121 provide further instruction to assign a timestamp value to sensor data received. The sensor data aggregation instructions 122 provide instruction to aggregate and store sensor data within an aggregated sensor dataset. An aggregated sensor dataset is a dataset that contains sensor data collected over a period of time. For example, if sensor data is received from the multi-sensor device 130 over a three minute timespan, from time t=0 seconds to t=180 seconds, then the sensor data aggregation instructions 122 provide instruction to the processing control unit 120 to aggregate and store the sensor data received between time t=0 to t=180 seconds in the aggregated sensor dataset. The video receiving instructions 123 provide instruction to initialize and receive a set of video frames that make up a video feed captured by the camera module 112. The video receiving instructions provide further instruction to assign a timestamp value to each video frame received and store the received video frames in a video frame dataset within the mobile computing device 110. A video frame dataset is a dataset used to store a sequence of video frames that make up a video feed over a specific period of time. The sensor data and video combination instructions 124 provide instruction to combine the aggregated sensor dataset and video frame dataset into a single combined video dataset based upon synchronizing sensor data and video frames based upon their assigned timestamp values. The single combined video dataset represents a video feed of a period of time of both the sensor data and the video frames combined by overlaying one on top of the other, placing a visual representation of the sensor data within the video frames, or placing a visual representation of the video frames within a visual representation of the sensor data, for example. The video export instructions 125 provide instruction to export the single combined video dataset as a data file to a data repository 150. The data repository 150 represents an external data repository that is separate from the mobile computing device 110 and may be used to store generated combined video files. The sensor data and video frame playback instructions 126 provide instruction to simultaneously playback the aggregated sensor dataset and the video frame dataset on the mobile computing device 110. In an embodiment, a user may configure placement and size of both the sensor data and the video frames within the simultaneous playback.

In an embodiment, the display unit 114 may be used to display the video frames and synchronized sensor data to the user. Embodiments of the display unit 114 may include, but are not limited to, a display screen on the mobile computing device or an external display device communicatively coupled to the mobile computing device 110.

3. Functional Overview

Figure 2:
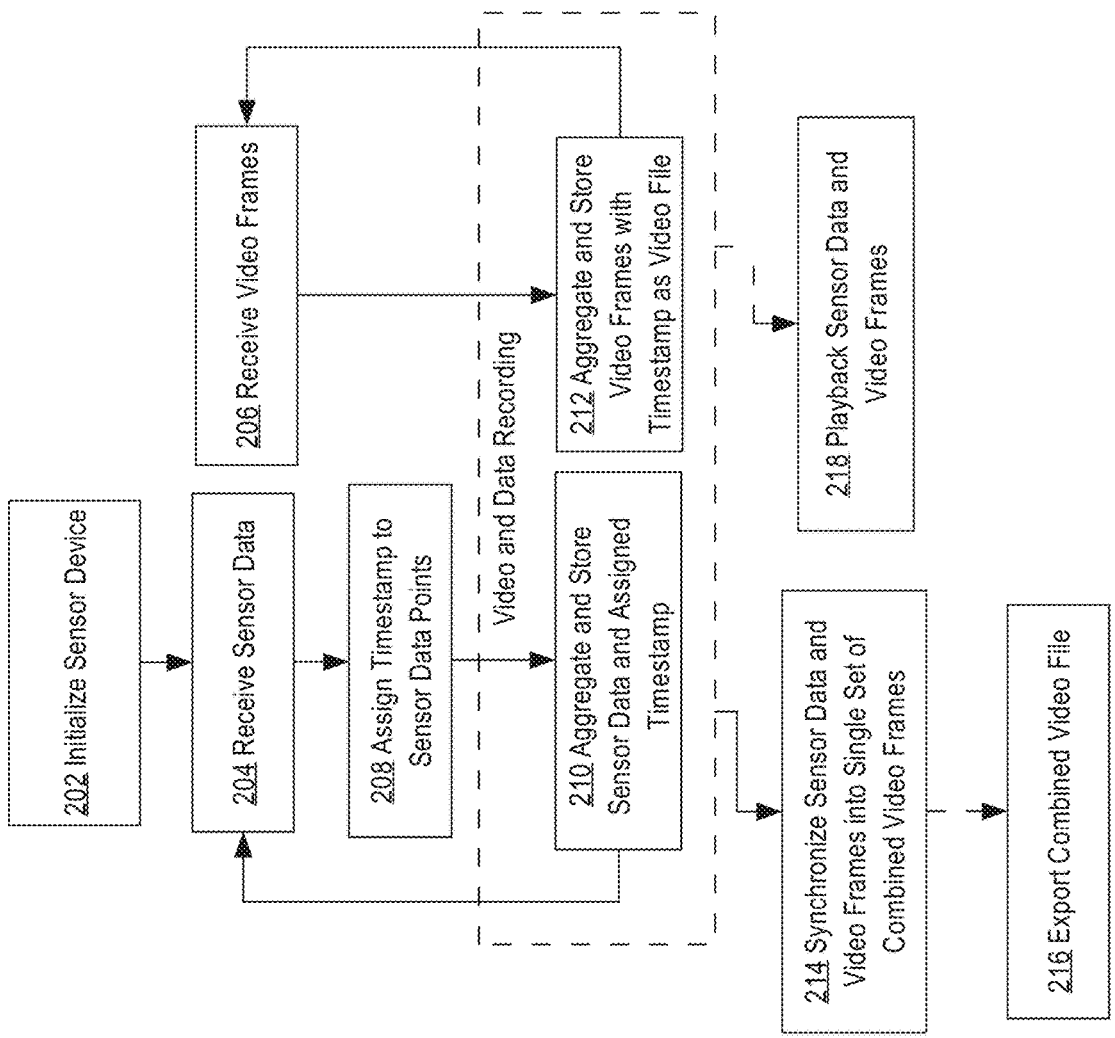
FIG. 2 illustrates an example method for receiving, synchronizing, and combining video and sensor data together.

FIG. 2 depicts an example embodiment of a method for receiving, synchronizing, and displaying video and sensor data together.

3.1. Sensor Data Input

At block 202 the mobile computing device 110 initiates a communication session with the multi-sensor device 130. In an embodiment, the sensor data receiving instructions 121 provide instruction for the mobile computing device 110 to initialize wireless communication with the multi-sensor device. Wireless communication may be implemented using different communication protocols including, but not limited to, Bluetooth, Bluetooth low energy, Wi-Fi, Zigbee, or any other wireless protocol. In an embodiment, initialization may include sending a request to connect from the mobile computing device 110 to the multi-sensor device 130. Once the request is sent to the multi-sensor device 130, the mobile computing device 110 may wait for the successful pairing message from the multi-sensor device 130.

In an embodiment, initialization from the mobile computing device 110 may also include a configuration request to configure sensor data collection and wireless transmission of sensor data from the multi-sensor device 130 to the mobile computing device 110. For example, the configuration request may include configuration parameters for configuring which type of sensor data to collect for transmission and the frequency at which transmission from the multi-sensor device 130 to the mobile computing device 110 should occur.

In an embodiment, the configuration request from the mobile computing device 110 to the multi-sensor device 130 may be based upon default configuration parameters, historical configuration parameters, or user inputted configuration parameters. Default configuration parameters may include preset configuration parameters that are stored within the mobile computing device 110. Alternatively, default configuration parameters may represent setting configuration parameters on the multi-sensor device 130 to the default setting of the multi-sensor device 130 itself. Historical configuration parameters may represent configuration parameters that have been used in previous sensor data collection sessions between the mobile computing device 110 and the multi-sensor device 130. Configuration parameters supplied by the user may represent parameter input that the user may have inputted into the mobile computing device 110 prior to initializing the multi-sensor device 130.

At block 204 the mobile computing device 110 receives sensor data from the multi-sensor device 130. In an embodiment, the sensor data receiving instructions 121 provide instruction to receive sensor data from the multi-sensor device 130. Referring to FIG. 1, sensor data is transmitted by the wireless transceiver 135, within the multi-sensor device 130, and received by the wireless transceiver 118. Sensor data may include one or more data points related to different types of data inputs measured by the multi-sensor device 130. For example, if the multi-sensor device 130 is attached to a football and is configured to observe and collect acceleration data, then when the ball is thrown, the multi-sensor device 130 collects acceleration data related to the thrown football and it packages the acceleration data into a sensor dataset that may include acceleration along the x, y, and z axes. The sensor dataset is then transmitted and received by the mobile computing device 110.

In an embodiment, the mobile computing device 110 may receive sensor data as a continuous stream of data, in which each dataset received represents an incremental point in time. Receiving a continuous stream of data may include sensor datasets that report unchanged values when no movement is sensed. In an alternative embodiment, the multi-sensor device 130 may be configured to only send sensor datasets when a change is observed. For example, if no acceleration is detected, then the multi-sensor device 130 may not send sensor datasets to the mobile computing device 110. In this scenario, the mobile computing device 110 would then only receive sensor datasets when physical changes are detected.

At block 208, the mobile computing device 110 assigns a timestamp value to each sensor dataset received. In an embodiment, the sensor data receiving instructions 121 provide instruction to obtain a timestamp value from the reference clock 116 and assign that timestamp value to the incoming sensor dataset. For example, when a sensor dataset is received by the processing control unit 120, the processing control unit 120 requests and obtains a current timestamp value from the reference clock 116. The processing control unit 120 assigns the obtained timestamp value to the sensor dataset.

At block 210, sensor datasets are aggregated and stored as an aggregated sensor dataset. The aggregated sensor dataset is a set of one or more sensor datasets that represent received sensor data over a specific period of time. In an embodiment, the specific period of time is defined by the timestamp values assigned to each sensor dataset. In an embodiment, the sensor data aggregation instructions 122 provide instruction to aggregate the one or more sensor datasets and store the one or more sensor datasets in aggregated sensor dataset. The aggregated sensor dataset is stored locally within the mobile computing device 110. In an embodiment, aggregation and storage of the one or more sensor datasets may be initiated when the user of the mobile computing device 110 presses a record button on the mobile computing device 110. After depressing the record button, the processing control unit 120 may begin to aggregate the received sensor data sets. In an embodiment, the processing control unit 120 may stop aggregation of sensor data sets when the user depresses the record button again to stop recording. Upon stopping the recording, the processing control unit 120 may then store the aggregated sensor dataset generated in a digital storage medium within the mobile computing device 110. In another embodiment, stopping aggregation may be based on a configured length of time that defines the length of each recording session.

In an embodiment, the stored aggregated sensor dataset may be represented as a data file formatted to contain a matrix array of sensor data sets each referenced by their assigned timestamp value. In an embodiment, the matrix array file may also be configured to store geo-locations associated with each sensor dataset. Geo-locations may be useful for data collaboration purposes with other devices, so that devices can access data files based on the geo-location associated with the sensor datasets.

3.2. Video Frame Input

At block 206, the processing control unit 120 receives one or more video frames from the camera module 112. In an embodiment, the video receiving instructions 123 provide instruction to receive the one or more video frames, which each represent a captured digital image, by the camera module 112, at a particular moment in time. For example, the camera module 112 may be initialized to capture a continuous stream of digital images of an observed area. The continuous stream of digital images may be represented as one or more video frames. The camera module 112 may then send the one or more video frames to the processing control unit 120. In an embodiment, block 206 may be performed before, after, or simultaneously with blocks 202, 204, 208. Receiving video frames from the camera module 112 is not dependent on receiving sensor data sets from the multi-sensor device 130.

In an embodiment, the video receiving instructions 123 may further provide instructions to initialize the camera module 112 to begin capturing a continuous stream of digital images. Initialization of the camera module 112 may also include a user enabling the camera function on the mobile computing device 110 using standard mobile operating system commands.

At block 212, the one or more video frames are assigned a timestamp value and are stored within a video frame dataset. In an embodiment, the video receiving instructions 123 provide instruction to the processing control unit 120 to assign a timestamp value to each of the received video frames and then store, within a digital storage medium, the one or more video frames in a video frame dataset. In an embodiment, assigning timestamp values and storing one or more video frames within the video frame dataset may be initiated by depressing the record button on the mobile computing device 110, as described in block 210. In an embodiment, depressing the record button may initiate both aggregation of sensor datasets at block 210 and assigning and storing video frames in a video frame dataset. In an embodiment, upon stopping the recording, the processing control unit 120 may then store the video frame dataset generated in a digital storage medium within the mobile computing device 110. In an embodiment the video frame dataset may be stored, within the mobile computing device 110, as a video file.

3.3. Synchronized and Combined Video

At block 214 the aggregated sensor dataset and the video frame dataset are synchronized and combined to generate a single combined digitally stored video file. In an embodiment, the sensor data and video combination instructions 124 provide instruction to synchronize and combine the aggregated sensor dataset and the video frame dataset into a single combined video dataset based upon the assigned timestamp values for each sensor dataset within the aggregated sensor dataset and the video frames within the video frame dataset. In an embodiment, the single combined video dataset represents a data file that includes combined video frames of sensor data and recorded video frames. The single combined video dataset may be generated as a digital video file.

Figure 3:
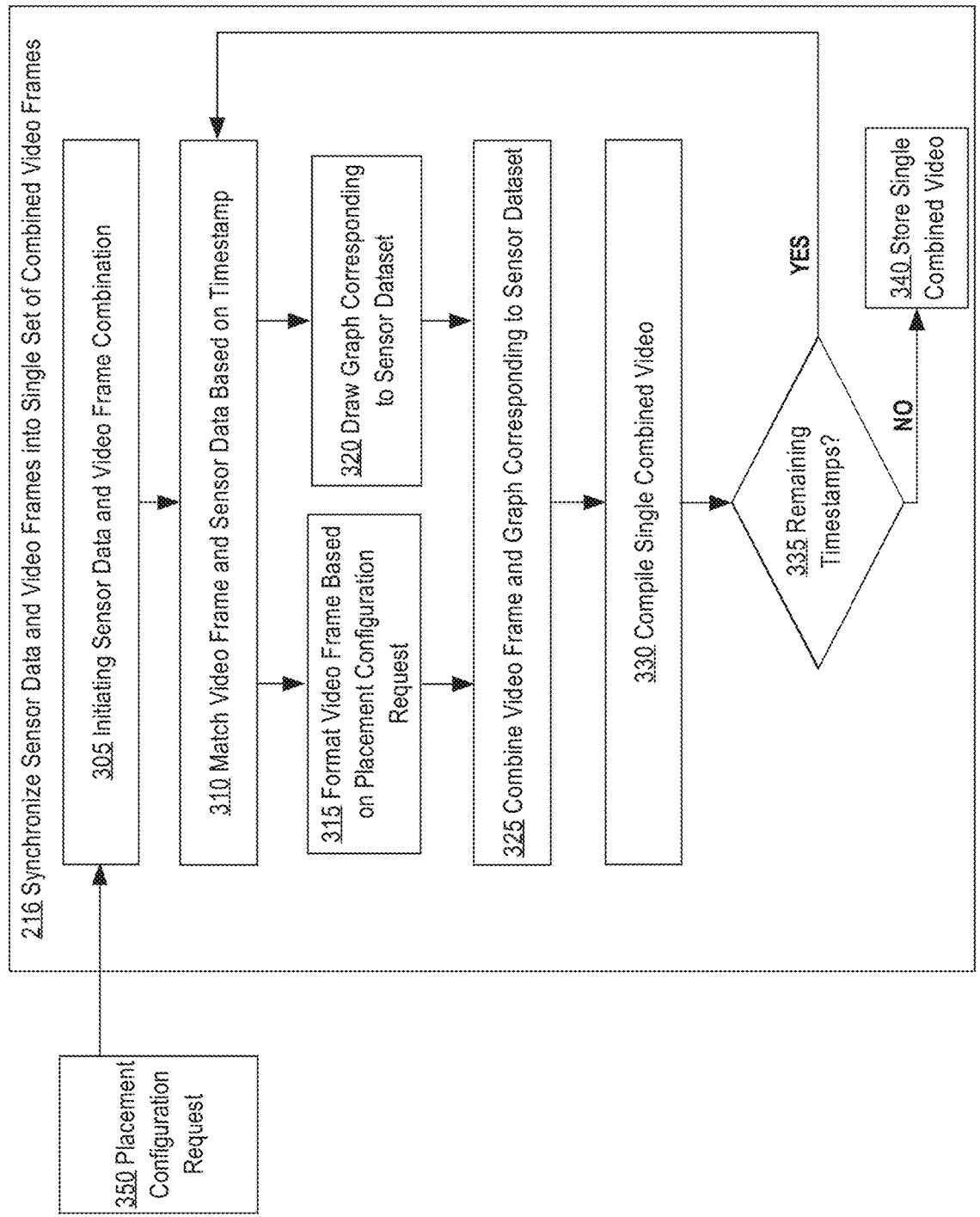
FIG. 3 illustrates a detailed example of synchronizing and combining sensor data and video frames into a single combined video dataset.

FIG. 3 depicts a detailed example of synchronizing and combining the aggregated sensor dataset and the video frame dataset into a single combined video dataset. Block 305 illustrates initiating the step of the synchronizing and combining the aggregated sensor dataset and the video frame dataset into a single combined video dataset. In an embodiment, synchronizing and combining may be initiated in response to input from a combine video button or an export button on the mobile computing device 110. In another embodiment, synchronizing and combining may be triggered by input indicating selecting placement and size options for combining the aggregated sensor dataset and the video frame dataset.

Block 350 depicts the processing control unit 120 receiving a placement configuration request to configure the size and placement for displaying both the sensor data and the video frames within the single combined video. In an embodiment, the placement configuration request contains configuration options to either overlay the sensor data onto the video frames or create a picture-in-picture effect with either the sensor data or the video frames displayed within a smaller picture-in-picture window. In an embodiment, configuration options that specify overlaying the sensor data onto the video frames may be generated by setting the background of the sensor data display to transparent and then overlaying the sensor data display on top of the video frame display such that the video frames may be visible behind the sensor data.

Figure 6:
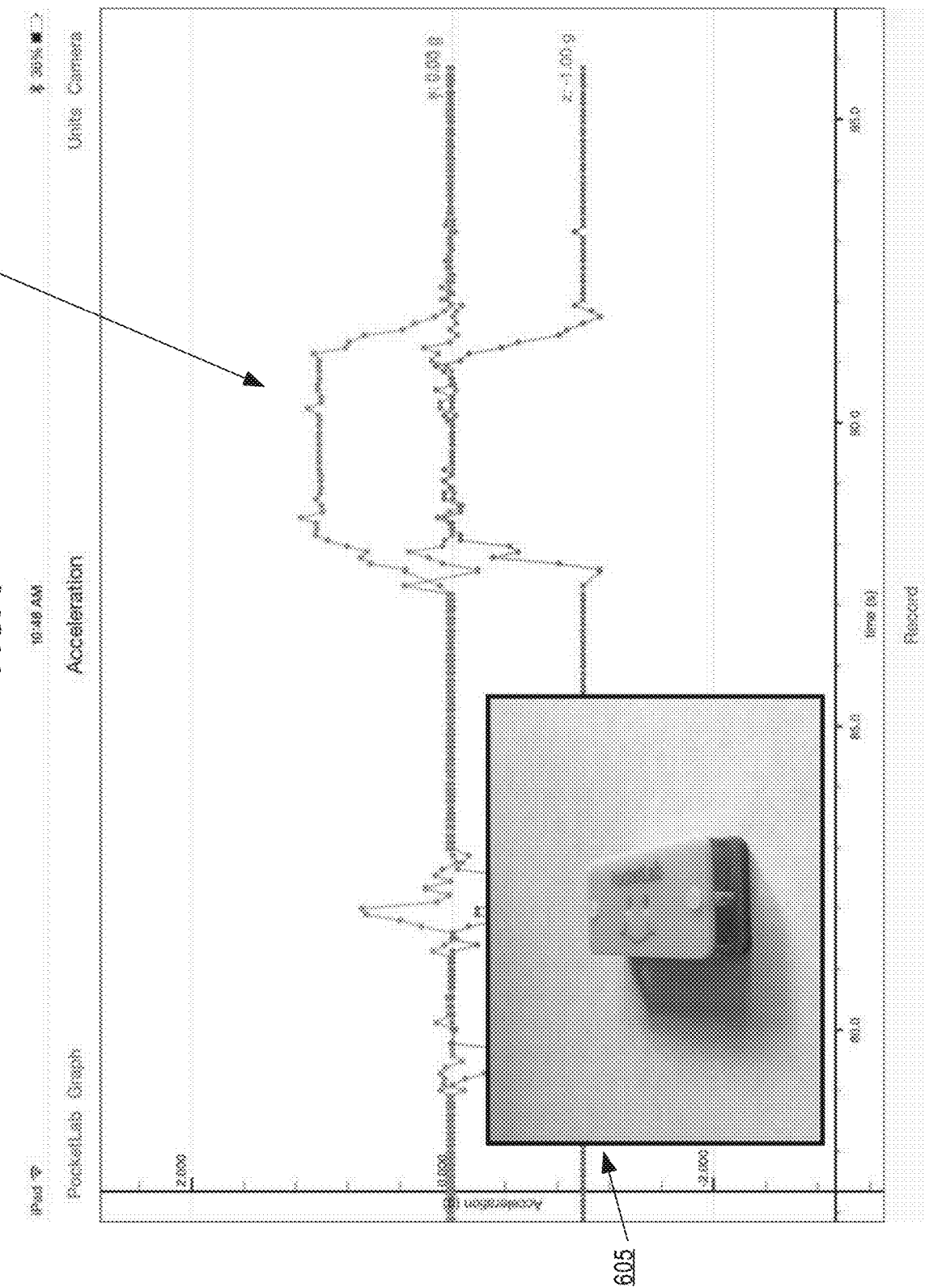
FIG. 6 illustrates an example of displaying video frames within a smaller display in the foreground and displaying sensor data within a larger background display.

In an embodiment, the placement configuration request may contain size placement configuration options to create a picture-in-picture view of the sensor data display or the video frame display. In an embodiment the placement configuration request may specify that the video frame display of the sensor data display is to be displayed within a picture-in-picture display. In this embodiment, the placement configuration request defines the reduced size of the picture-in-picture window and the placement of the picture-in-picture window within the larger main display. For example, the placement configuration request may specify that the video frames be within a picture-in-picture window, in which the picture-in-picture window size is 25% of the size of the sensor data display and is to be placed in the bottom left corner of the sensor data display. FIG. 6 illustrates an example of a picture-in-picture display with the video frames within a reduced picture-in-picture display. Picture-in-picture window 605 depicts the reduced video frame. Sensor data display 610 represents a graphical display of sensor data that is displayed in the background of the combined video.

At block 310, the processing control unit 120 synchronizes a video frame from the video frame dataset to a sensor dataset from the aggregated sensor dataset by identifying and matching a corresponding timestamp value between a video frame and a sensor dataset. For example, the video frame associated with timestamp value 0 is matched to the sensor dataset that is associated with timestamp value 0.

At block 315, the processing control unit 120 formats the display of the matched video frame from block 310 based upon the placement configuration request received (block 350). For example, if the placement configuration request contained configuration parameters to reduce the size of the video frame to 25% and place the video frame in the bottom left-hand corner then in response the processing control unit 120 is programmed to generate a display of the video frame that is reduced to 25% of the original display size and would configure the placement of the display at coordinates such that the video frame is displayed in the bottom left-hand corner. In an embodiment, if no placement configuration request is received at block 305, then the processing control unit 120 is programmed to format the video frame based upon default formatting parameters or based upon historical formatting parameters.

Concurrent with block 315, at block 320 the processing control unit 120 formats and generates a graphical representation of sensor data within the sensor dataset associated with the matching timestamp value. In an embodiment, the processing control unit 120 generates a sensor data graph of the sensor data in relation to the associated timestamp value. For example, the sensor dataset corresponding to the matched timestamp value at block 310 may include observed acceleration values along the x, y, and z axes of the multi-sensor device 130. The processing control unit 120 may generate a sensor data graph having a y-axis that specifies a magnitude of g-force values and an x-axis indicating time values. The observed acceleration values for the x, y, and z axes of the multi-sensor device 130 are then plotted as distinct points on the graph. In an embodiment, the different acceleration values are distinguished from each other using different colors to represent different acceleration values for each of the x, y, and z axes.

In an embodiment, the sensor data graph may include sensor data points associated with a time range of timestamp values that were recorded before the matching timestamp value. The time range of sensor data refers to a range of data points that may be visible along the x-axis time range of the sensor data graph. For example, if the placement configuration request specifies that the x-axis of the sensor data graph displays a five-second range of the 60 second recorded session, then the generated sensor data graph would include a five-second time range of sensor data. In an embodiment, the sensor data displayed includes sensor data starting at timestamp value n–5 and ending at timestamp value n, where n is the matching timestamp value.

In an embodiment, the processing control unit 120 may generate multiple sensor data graphs for each of the observed sensor data based upon the type of sensor data observed. For example, the multi-sensor device 130 may send sensor data related to both the acceleration and the angular velocity of the multi-sensor device 130. The processing control unit 120 may then create a single graph for the observed acceleration, with multiple plot points for each of the x, y, and z axes, and then create a second graph for plotting the angular velocity observed by the multi-sensor device 130.

Figure 8:
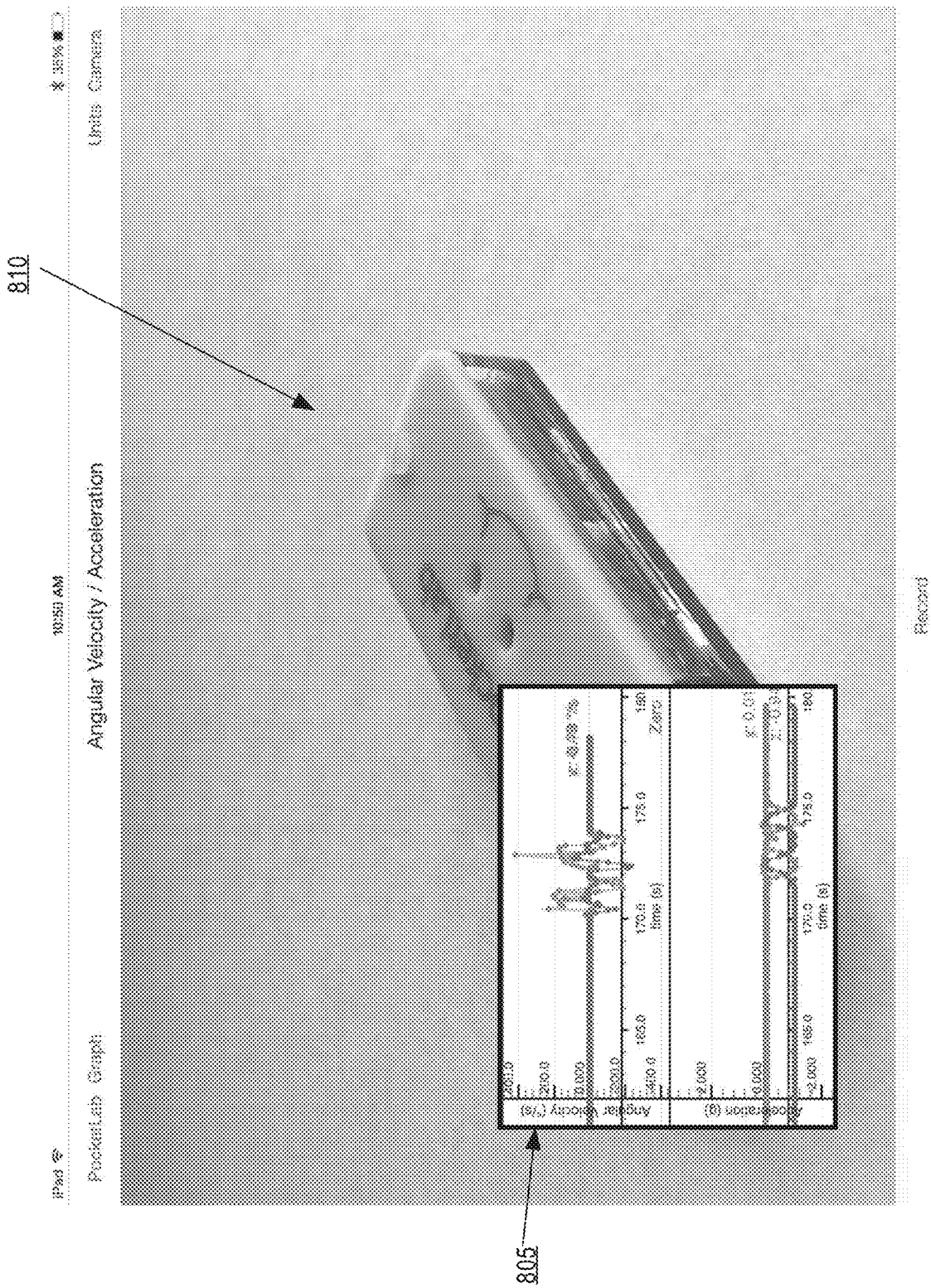
FIG. 8 illustrates an example of displaying sensor data within a smaller display in the foreground and displaying video frames within a larger background display.

In an embodiment, the processing control unit 120 may format the generated sensor data graph according to the placement configuration request received. For example, if the placement configuration request specifies that the sensor data is to be displayed within a picture-in-picture window, then the processing control unit 120 is programmed to reduce the size of the sensor data graph and place the reduced graph at the specified coordinates according to the placement configuration request. FIG. 8 illustrates an example in which the placement configuration request included parameters to display the sensor data graph within a picture-in-picture display in the bottom left-hand corner. Sensor data graph 805 represents the reduced sensor data graph displayed in the bottom right-hand corner of the larger video frame display. Video frame 810 represents the video frame associated with the current timestamp value. The video frame 810 has been formatted to be placed in the background such that, the sensor data graph 805 is placed on top of the video frame 810.

Figure 5:
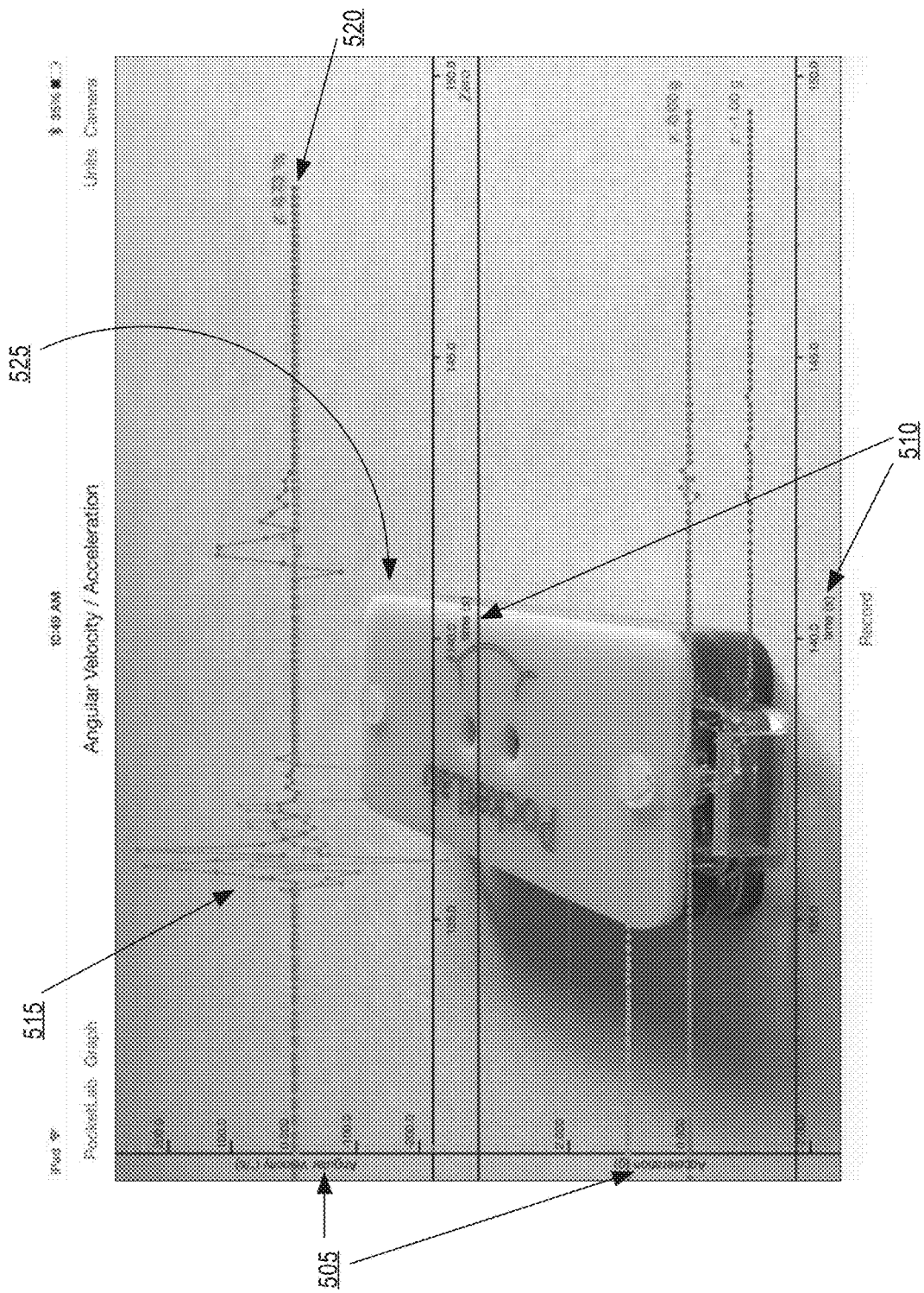
FIG. 5 illustrates an example of displaying sensor data superimposed over video frames.

In an embodiment, the placement configuration request may specify that the sensor data graph is to be overlaid on top of the video frame, such that both the sensor data and the video frame are both visible. The processing control unit 120 formats the sensor data graph by making the graph background transparent so that when overlaid on top of the video frame, the video frame acts as the background for the sensor data graph. FIG. 5 depicts a representation of overlaying the sensor data graph on top of the video frame. In FIG. 5, the processing control unit 120 generates two the sensor data graphs, one graphing the angular velocity and the other graphing the acceleration. Y-axes 505 shows that a y-axis of top graph represents the angular velocity in degrees per second and a y-axis of the bottom graph represents the acceleration in g-forces. The x-axes 510 shows that both x-axes of the top graph and bottom graph represent time measured in seconds and correlate to timestamp values for each sensor data point. Plot points 515 illustrate the graphed plot points for the sensor data at previous timestamp values. Current plot point 520 is the observed sensor data related to the currently matched timestamp value that correlates with the currently displayed video frame 525. Video frame 525 represents the video frame related to the currently matched timestamp value.

At block 325, the processing control unit 120 combines the generated video frame from block 310 and the generated sensor data from block 320 into a single display. In an embodiment, the manner in which the combination of the video frame and sensor data are combined is based upon the received placement configuration request, the formatted video frame, and the formatted sensor data graph. For example, if the placement configuration request specified that the video frame is to be within a picture-in-picture display in the bottom right hand corner, then the single display would overlay the picture-in-picture representation of the video frame on top of the sensor display data.

Similarly, if the placement configuration request specified that the sensor data graph is to be transparently overlaid onto the video frame, then the processing control unit 120 would overlay the formatted sensor data graph onto the video frame. Since the formatted sensor data graph would have a transparent background, the video frame would be visible behind the sensor data graph.

At block 330, the processing control unit 120 compiles a set of the combined video frames into a single combined video. The single combined video represents a sequence of the combined video frames which, when played in sequence, display a combined video of the video frames and an animated sensor data graph of the aggregated sensor dataset that shows sensor data points over a specific moving time range.

At block 335, the processing control unit 120 determines whether there are remaining video frames and remaining sensor datasets that need to be combined based upon their timestamp values. For example if at block 330, the processing control unit 120 combined the video frame and sensor data graph that corresponds to timestamp value 20 and video frame dataset and aggregated sensor dataset contains video frames and sensor data corresponding to timestamp values from 0 to 100, then the processing control unit 120 would loop back to block 310 to match the video frame and sensor dataset that corresponds to the next available timestamp value (timestamp value 21). If at block 335, the processing control unit 120 determines that there are no remaining video frames and sensor data to be combined, then the processing control unit 120 would proceed to block 340. At block 340 the processing control unit 120 stores the single combined video, within the mobile computing device 110, as a single digital video file. The single digital video file may be stored in any commercially available digital video format.

Referring back to FIG. 2, in one embodiment, the processing control unit 120 may export the single digital video file to a data repository 150. In an embodiment, the video export instructions 125 provide instruction to export the single combined video dataset as a data file to a data repository 150. The data repository 150 may be implemented using an external personal computer, external data server, external cloud server, or any other external storage medium that is not part of the mobile computing device 110. In an embodiment, the processing control unit 120 may export video formats of the single combined video, the video frame dataset as a video file, and the aggregated sensor dataset as an animated graph in compressed a compressed video file. In another embodiment, the processing control unit 120 may export a data file that includes all of the sensor data points of the aggregated sensor dataset including their corresponding timestamp values.

3.4. Simultaneous Playback

Optionally, the system may be programmed to display the recorded aggregated sensor dataset and video frame dataset on the mobile device before creating a single combined video. Referring back to FIG. 2, block 218 represents optional simultaneous playback of the sensor datasets and video frames. In an embodiment, the sensor data and video frame playback instructions 126 provide instruction to simultaneously playback the aggregated sensor dataset and the video frame dataset on the mobile computing device 110. The processing control unit 120 may be configured to simultaneously playback a display containing both sensor datasets and video frames synchronized by their assigned timestamp values.

Figure 4:
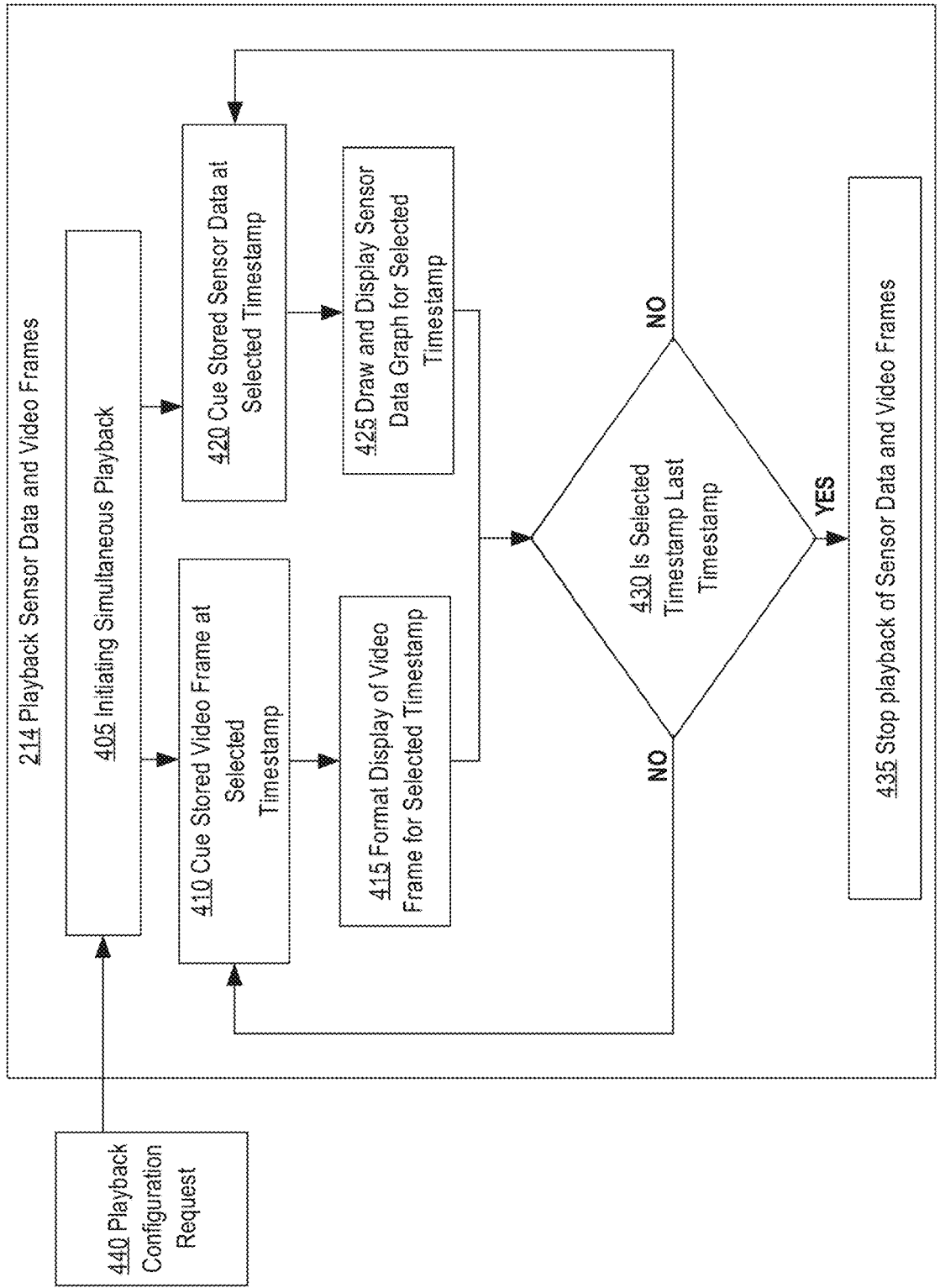
FIG. 4 illustrates a detailed example of simultaneously playing back recorded aggregated sensor dataset and video frame dataset on the mobile device.

FIG. 4 depicts an example process of simultaneously playing back the recorded aggregated sensor dataset and video frame dataset on the mobile device. At block 405, simultaneous playback on the mobile computing device 110 is initiated. In an embodiment, simultaneous playback may be initiated in response to the input indicating selecting a playback button. In another embodiment, simultaneous playback may be triggered by input indicating selecting video placement and size options for simultaneous playback. For example, input signals may indicate the sensor data to be transparently overlaid on top of the video frames and have the playback start at timestamp value 25 and stop at timestamp value 165. The playback may be triggered to begin after the playback configuration options are saved, or in response to input indicating pressing a preview button. Block 440 depicts the processing control unit 120 receiving the playback configuration request. The playback configuration request may include playback options for size and placement of the sensor data and the video frames and a range of timestamp values to playback.

At block 410, the processing control unit 120 identifies and queues the video to be displayed based upon the current timestamp value. For example, in response to input that initiated playback from timestamp value 0, the processing control unit 120 would designate the current timestamp value as 0 and then identify and queue the video frame that is assigned the timestamp value 0 for formatting and display. If however, the current timestamp value is 50, then the processing unit would designate the current timestamp value as 50 and then identify and queue the video frame that is assigned the timestamp value 50 for formatting and display. At block 415, the processing control unit 120 formats and displays the queued video frame on the display unit 114 of the mobile computing device 110. For example, if the playback configuration request specified that the video frame is to be displayed within a picture-in-picture window then the processing control unit 120 would format the video by reducing the display size and placing the video at the specified coordinates of the picture-in-picture display.

Simultaneous to block 410, at block 420 the processing control unit 120 identifies and queues the sensor dataset to be displayed based upon the current timestamp value. For example, if the current timestamp value is 0, then the processing control unit 120 identifies and queues the sensor dataset from the aggregated sensor dataset that corresponds to timestamp value 0. In an embodiment, identifying and queuing the sensor dataset may also include identifying sensor datasets that corresponds to historical sensor data that are to be displayed as part of a visible time range of sensor data. In an embodiment, the visible time range of sensor data may include sensor data points associated with a time range of timestamp values that were recorded before the current timestamp value. The time range of sensor data refers to a range of data points that may be visible within the current display of the sensor data graph. For example, if a user wants to see a five-second graph of sensor data points related to acceleration along the x-axis for a 60 second recorded session, and then the sensor data graph would show the five-second window of sensor acceleration data displayed in synchronization with the corresponding video. As the simultaneous sensor data and video frames are played back the sensor data points would shift across the screen from right to left as the x-axis, which represents time, would progress through the 60 second window.

At block 425, the processing control unit 120 generates a graphical representation of the sensor dataset at the current timestamp value based upon the playback configuration request. In an embodiment, the playback configuration request may specify the graph size, placement of a sensor data graph within the entire playback display, the types of sensor data to be graphed, the number of graphs to display, the magnitude of the x- and y-axis measurements, and the visible time range to be displayed.

In an embodiment, at block 415 and block 425, the processing control unit 120 may receive a second playback configuration request to adjust the playback configuration option during the current playback period. For example, if the original playback configuration request specified that the video frames are to be displayed within a picture-in-picture window and the second playback configuration request specifies that the sensor data graph is to be transparently overlaid onto the video frame, then the processing control unit 120 would dynamically reformat the video frame and sensor data graph at the current timestamp to reflect the updated playback configuration options. Options for adjusting the playback configuration are discussed in detail in the VIDEO AND SENSOR DATA GRAPH DISPLAY section herein.

Simultaneous display of the video frame from block 415 and sensor display graph from block 425 are displayed on the display unit 114 of the mobile computing device 110. At decision diamond 430, the processing control unit 120 determines whether additional video frames and sensor datasets need to be displayed on the display unit 114. In an embodiment, the processing control unit 120 determines whether the current timestamp value n is the last timestamp stored in the video frame dataset and the aggregated sensor dataset. If the current timestamp value n is the last timestamp value, then the processing control unit 120 proceeds to block 435, at which simultaneous playback stops. If however, the current timestamp value n is not the last timestamp value the processing control unit 120 then advances the current timestamp value from n to n+1 and loops back to block 410 and block 420. At block 410 the processing control unit 120 queues the video frame that corresponds to the current timestamp value n+1. At block 420 the processing control unit 120 queues the sensor dataset that corresponds to the current timestamp value n+1. In an embodiment, if there is no sensor data that corresponds to the current timestamp value n+1, the processing control unit 120 identifies the sensor datasets that correspond to previous sensor data in order to create a sensor data graph that includes sensor data within the configured time range. For example, if the configured time range for displaying sensor data is 10 seconds and sensor datasets within the aggregated sensor dataset only correspond to sensor data received at every two seconds, then the processing control unit 120 would identify all sensor data that falls within the n−10 second window. The identified sensor data would include sensor data at timestamp values n−1, n−3, n−5, n−7, and n−9 to generate the sensor data graph corresponding to timestamp value n with the configured time range of 10 seconds.

4. Video and Sensor Data Graph Display

Figure 7:
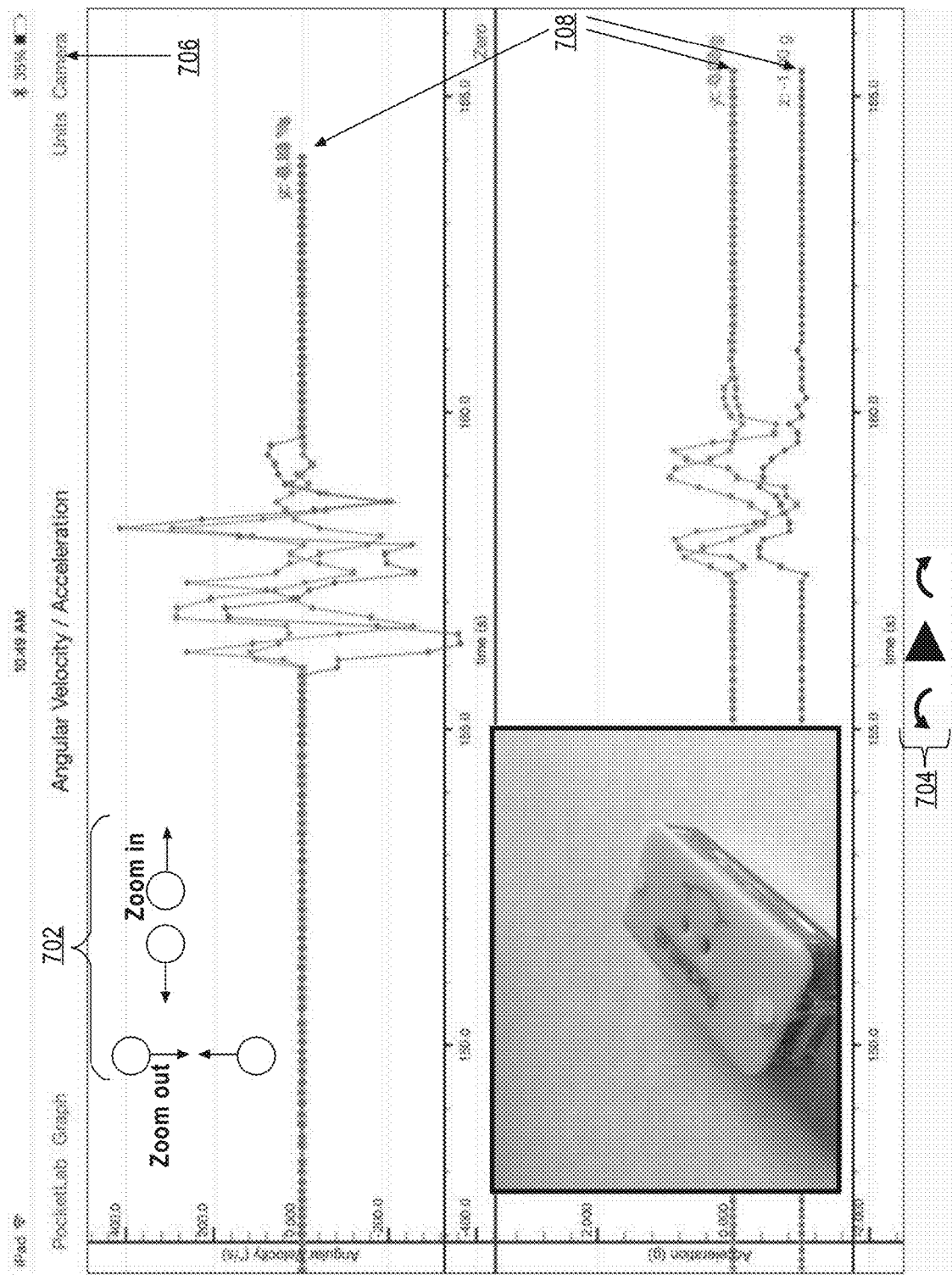
FIG. 7 illustrates an example of displaying two sensor data graphs in a larger background display and displaying video frames within a smaller display in the foreground.

In an embodiment, the user may configure the display of the video and sensor data on the mobile computing device. FIG. 7 illustrates an embodiment of the display including a sensor data graph displaying two graphs in the background and the video frame displaying within a picture-in-picture display in the foreground.

Point 702 illustrates the user adjusting the display of the sensor data graph by either zooming in or out the sensor data graph. The zooming feature is enabled using touchscreen finger gestures such as pinching or spreading of two touching fingers. Touchscreen gestures may be implemented on the mobile computing device by listening for touch events that trigger the mobile computing device to recognize that the user is pinching or making a specific gesture on the touchscreen. By zooming in or out, the processing control unit 120 updates the magnitude of the x-axis, y-axis, or both when generating subsequent sensor data graphs.

Point 704 illustrates the available playback functionality. As shown, the user may use a play/pause button to play or pause the current animated graph. The user may use the left curled arrow to step backwards a specific number of frames or use the right curled arrow to step forward a certain number of frames.

Point 706 highlights a camera button, which may be used to toggle between the graph only, full screen video and graph, and concurrent synchronized display viewing modes.

Points 708 illustrate the current sensor data values of the sensor data graph. In an embodiment, the current sensor data values indicate the sensor values that are associated with the currently displayed video frame.

Point 314 illustrates the exporting functionality as an output button. When the user touches the "upload" button the mobile computing device prompts the user to select export methods for the video and sensor data to the data repository 150.

FIG. 5 illustrates an embodiment of displaying the sensor data superimposed over the video feed. In this display mode, the video feed is positioned behind the sensor data graph and the background of the sensor data graph is made transparent so that the video may be seen. The playback features are the same as described in FIG. 7.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
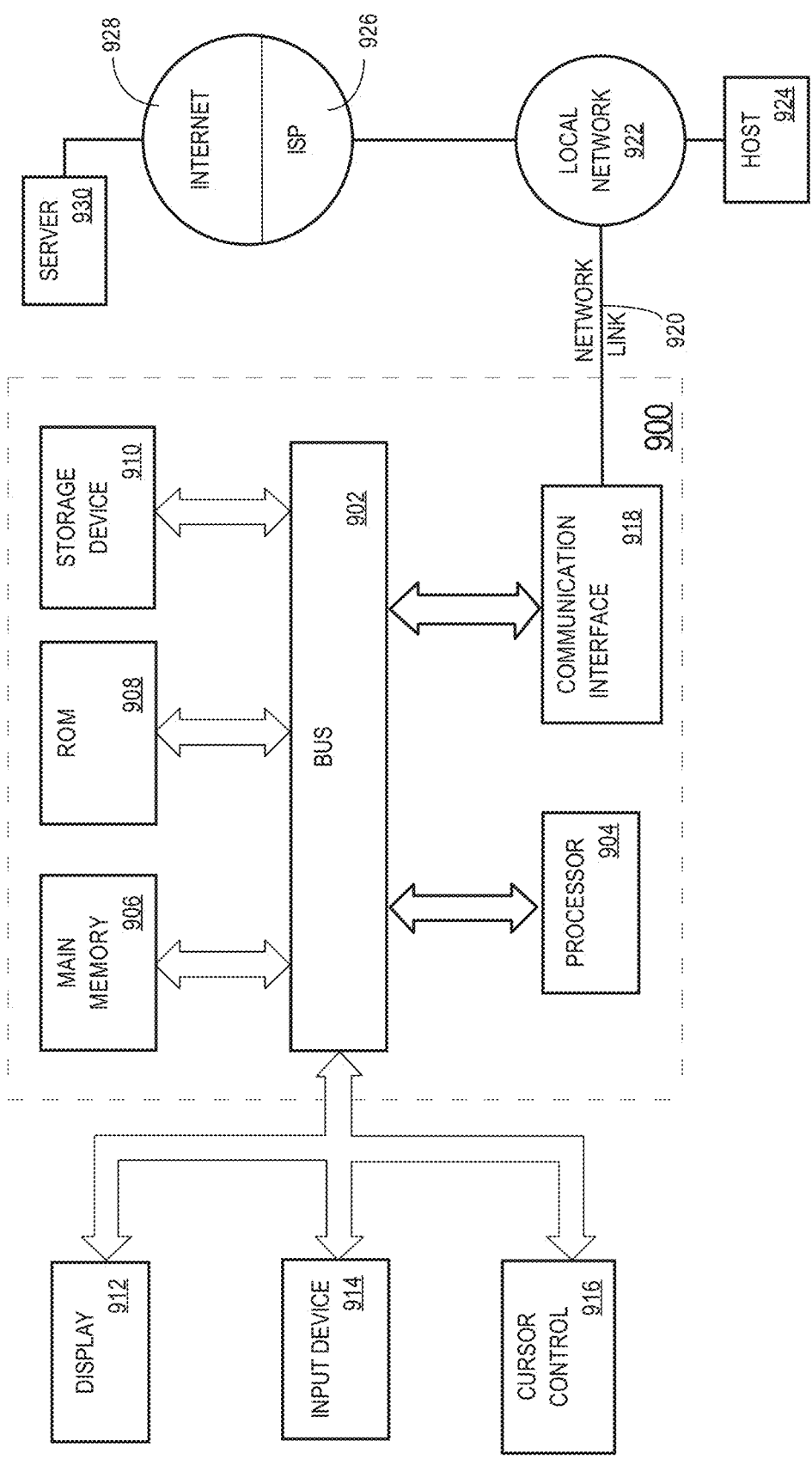
FIG. 9 illustrates an example computer system with which embodiments may be used.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general-purpose microprocessor.

Computer system 900 also includes a main memory 906, such as a random-access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated-services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world-wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method for synchronizing and simultaneously playing sensor data and video frame data, the method comprising:
   receiving, at a computing device, input indicating a selection of a particular timestamp value from a plurality of timestamp values, and a selection of a particular timestamp range that starts at the particular timestamp value;
   sending, from the computing device to a multi-sensor device, a configuration request comprising both: a frequency configuration information specifying a frequency at which sensor data is to be received from the multi-sensor device, and a datapoints types configuration information specifying types of data is to be received from the multi-sensor device; wherein the frequency configuration information is different than the datapoints types configuration information;
   receiving, at the computing device, from the multi-sensor device, a data point set that includes a plurality of data points, of the one or more types, that have been captured during the particular timestamp range;
   generating a first graphical representation of the data point set;
   receiving a video frame set that includes a plurality of video frames that have been captured during the particular timestamp range;
   generating a second graphical representation of the video frame set;
   receiving placement configuration data for the first graphical representation and the second graphical representation;
   based on the placement configuration data, adjusting relative sizes and placements of displays of the first graphical representation and the second graphical representation;
   synchronizing playing contents of the first graphical representation with playing contents of the second graphical representation by queueing the first graphical representation and the second graphical representation at the particular timestamp value and by playing their respective contents from the particular timestamp value and over the particular timestamp range.

2. The method of claim 1, further comprising:
   wirelessly receiving sensor data from a multi-sensor device that comprises a plurality of physical sensors, based upon measurements from the plurality of physical sensors, wherein the sensor data comprises the plurality of data points representing observations at a particular point in time;
   assigning a plurality of timestamp values obtained from an internal clock, within a mobile computing device that is wirelessly coupled to the multi-sensor device, to the plurality of data points.

3. The method of claim 2, further comprising:
   receiving one or more video frames using a video camera in the mobile computing device.

4. The method of claim 3, further comprising:
   receiving a placement configuration request to configure a size and a placement of two or more graphical representations and one or more video frames within a single combined video dataset;
   in response to receiving the placement configuration request, parsing size and placement configuration parameters for the two or more graphical representations and one or more video frames.

5. The method of claim 3, further comprising:
   receiving a placement configuration request that includes a request to overlay two or more graphical representations over one or more video frames;
   in response to receiving the placement configuration request modifying the two or more graphical representations by making a background of the two or more graphical representations transparent;
   designating placement of the one or more video frames to background of a single combined video dataset;
   designating placement of the two or more graphical representations to foreground of a single combined video dataset.

6. The method of claim 3, further comprising:
   receiving a playback configuration request that includes size and placement configuration definitions for two or more graphical representations and one or more video frames, and in response thereto parsing size and placement configuration definitions for the two or more graphical representations and the one or more video frames;
   adjusting relative size and placement of display of the two or more graphical representations, based upon the size and placement configuration definitions for the two or more graphical representations;
   adjusting relative size and placement of display of the one or more video frames, based upon the size and placement configuration definitions for the one or more video frames.

7. The method of claim 6, wherein the playback configuration request includes a request to overlay the two or more graphical representations over the one or more video frames.

8. The method of claim 7, further comprising:
   in response to receiving the request to overlay the two or more graphical representations over the one or more video frames, updating simultaneous display by designating placement of the one or more video frames to background of the simultaneous display and designating placement of the two or more graphical representations to foreground of the simultaneous display.

9. The method of claim 8, further comprising:
   receiving a playback configuration request that includes size and placement configuration definitions for a second graphical representation and a second video frame; and
   in response to a playback configuration request:
   adjusting relative size and placement of display of the second graphical representation, based upon a size and placement configuration definitions for the second graphical representation;
   adjusting relative size and placement of display of the second video frame, based upon the size and placement configuration definitions for the second video frame.

10. One or more non-transitory computer-readable media storing downloadable application instructions which, when downloaded to and executed by one or more processors on a computing device, cause the one or more processors to perform:
   receiving, at a computing device, input indicating a selection of a particular timestamp value from a plurality of timestamp values, and a selection of a particular timestamp range that starts at the particular timestamp value;

sending, from the computing device to a multi-sensor device, a configuration request comprising both: a frequency configuration information specifying a frequency at which sensor data is to be received from the multi-sensor device, and a datapoints types configuration information specifying types of data is to be received from the multi-sensor device; wherein the frequency configuration information is different than the datapoints types configuration information;

receiving, at the computing device, from the multi-sensor device, a data point set that includes a plurality of data points, of the one or more types, that have been captured during the particular timestamp range;

generating a first graphical representation of the data point set;

receiving a video frame set that includes a plurality of video frames that have been captured during the particular timestamp range;

generating a second graphical representation of the video frame set;

receiving placement configuration data for the first graphical representation and the second graphical representation;

based on the placement configuration data, adjusting relative sizes and placements of displays of the first graphical representation and the second graphical representation;

synchronizing playing contents of the first graphical representation with playing contents of the second graphical representation by queueing the first graphical representation and the second graphical representation at the particular timestamp value and by playing their respective contents from the particular timestamp value and over the particular timestamp range.

11. The one or more non-transitory computer-readable media of claim 10, storing additional instructions which, when downloaded to and executed by the one or more processors, cause the one or more processors to perform:
wirelessly receiving sensor data from a multi-sensor device that comprises a plurality of physical sensors, based upon measurements from the plurality of physical sensors, wherein the sensor data comprises the plurality of data points representing observations at a particular point in time;
assigning a plurality of timestamp values obtained from an internal clock, within a mobile computing device that is wirelessly coupled to the multi-sensor device, to the plurality of data points.

12. The one or more non-transitory computer-readable media of claim 11, storing additional instructions which, when downloaded to and executed by the one or more processors, cause the one or more processors to perform:
receiving one or more video frames using a video camera in the mobile computing device.

13. The one or more non-transitory computer-readable media of claim 12, storing additional instructions which, when downloaded to and executed by the one or more processors, cause the one or more processors to perform:
receiving a placement configuration request to configure a size and a placement of two or more graphical representations and one or more video frames within a single combined video dataset;
in response to receiving the placement configuration request, parsing size and placement configuration parameters for the two or more graphical representations and one or more video frames.

14. The one or more non-transitory computer-readable media of claim 12, storing additional instructions which, when downloaded to and executed by the one or more processors, cause the one or more processors to perform:
receiving a placement configuration request that includes a request to overlay two or more graphical representations over one or more video frames;
in response to receiving the placement configuration request modifying the two or more graphical representations by making a background of the two or more graphical representations transparent;
designating placement of the one or more video frames to background of a single combined video dataset; and
designating placement of the two or more graphical representations to foreground of a single combined video dataset.

15. The one or more non-transitory computer-readable media of claim 12, storing additional instructions which, when downloaded to and executed by the one or more processors, cause the one or more processors to perform:
receiving a playback configuration request that includes size and placement configuration definitions for two or more graphical representations and one or more video frames, and in response thereto parsing size and placement configuration definitions for the two or more graphical representations and the one or more video frames;
adjusting relative size and placement of display of the two or more graphical representations, based upon the size and placement configuration definitions for the two or more graphical representations;
adjusting relative size and placement of display of the one or more video frames, based upon the size and placement configuration definitions for the one or more video frames.

16. The one or more non-transitory computer-readable media of claim 15, wherein the playback configuration request includes a request to overlay the two or more graphical representations over the one or more video frames.

17. The one or more non-transitory computer-readable media of claim 16, storing additional instructions which, when downloaded to and executed by the one or more processors, cause the one or more processors to perform:
in response to receiving the request to overlay the two or more graphical representations over the one or more video frames, updating simultaneous display by designating placement of the one or more video frames to background of the simultaneous display and designating placement of the two or more graphical representations to foreground of the simultaneous display.

18. The one or more non-transitory computer-readable media of claim 17, storing additional instructions which, when downloaded to and executed by the one or more processors, cause the one or more processors to perform:
receiving a playback configuration request that includes size and placement configuration definitions for a second graphical representation and a second video frame; and
in response to a playback configuration request:
adjusting relative size and placement of display of the second graphical representation, based upon a size and placement configuration definitions for the second graphical representation; and
adjusting relative size and placement of display of the second video frame, based upon the size and placement configuration definitions for the second video frame.

* * * * *